UNITED STATES PATENT OFFICE.

CHARLES E. McADAM, OF CHICAGO, ILLINOIS.

BLEACHING AND CLEANING COMPOSITION.

1,335,171.  Specification of Letters Patent.  Patented Mar. 30, 1920.

No Drawing.  Application filed November 2, 1916. Serial No. 129,053.

*To all whom it may concern:*

Be it known that I, CHARLES E. McADAM, a citizen of the United States, and a resident of Chicago, in the county of Cook and State of Illinois, have invented certain new and useful Improvements in Bleaching and Cleaning Compositions; and I do hereby declare that the following is a full, clear, and exact description thereof.

This invention relates to new and useful improvements in bleaching and cleaning compositions and the process for preparing the same, and more particularly to a cleaning and bleaching agent composed of inorganic salts so composed as not to deteriorate upon storing, which will have no deleterious effect upon cellulose or animal fiber and which upon the addition of water in proper proportions will be immediately ready for use.

The invention comprehends essentially a composition comprising a mixture of an acid salt of a mineral acid, with at least two alkali halogen salts, whereby in use the liberation of the halogen acids is progressive and the resulting mixture of the halogen acids in solution much more efficient for purposes of bleaching and cleaning.

It is a fact that a mixture of sodium bisulfate, sodium fluorid and sodium silico fluorid, is both a cleansing and a bleaching composition. Such a mixture, *per se*, is however open to serious objections in actual use. Such a mixture deteriorates upon storage to the point of being no longer useful for cleaning and bleaching purposes. Moreover, when such a mixture is applied in use to cellulose or animal fiber, it affects the fiber, destroying and rotting the goods. These difficulties are entirely avoided by my new bleaching and cleaning composition.

I am aware, also, that both hydrochloric and hydrofluoric acids have been liberated by sodium bisulfate, and that the addition of liquid acetic acid to a mixture of alkali fluorid and sodium bisulfate will give a progressive liberation of halogen acid; but such a composition is not commercial. It has no stability, and after a few days' standing, it will have so completely deteriorated that a solution of the same at such time will not give marked bleaching action.

A composition suitable for removing fruit stains, ink, grease, paint, etc., from garments or fabrics, without damage to cellulose or animal fiber, may be prepared as follows: I take sodium fluorid, 50 pounds, and sodium chlorid, 50 pounds, and intimately mix them. Then sodium bisulfate, 100 pounds, is added and the stirring continued. This process or combination is accompanied by active disengagement of heat and the end of the process is clearly attained when the resultant composition cools off to normal temperature.

The new cleaning and bleaching composition is now ground in a suitable grinder to a uniform degree of fineness and is then ready for use.

The practical operation of my new bleaching and cleaning composition consists in adding it to suitable quantities of either hot or cold water, and in treating the goods to be cleaned and bleached with the solution. For instance, for removing rust, fruit stains, ink, grease, paint, etc., from three to ten ounces are used in one gallon of water; and where the stain is hard and difficult to remove, from sixteen to eighteen ounces in one gallon of water. The stained garment may be suitably boiled in the mixture, say from five to fifteen minutes,—all without causing damage to the fabric. For removing very bad stains, the composition may be put directly upon the stain and live steam blown upon both the bleacher and stain.

I find, in use, the action of the salt liberates the hydrochloric acid first, and it in turn liberates hydrofluoric acid. This successive or progressive action is of value, since the hydrochloric acid seems to attack the substance being treated and puts it in a more receptive condition for the attack of the hydrofluoric acid, thereby producing a more perfect and satisfactory cleanser and bleacher.

I find that it is a fact, demonstrated by repeated applications, that commercially satisfactory bleaching and decolorizing results are not obtainable by the mixture of a single alkali halogen and salt with sodium bisulfate, and that to produce the progressive action above stated, and the efficient bleaching and cleaning, the mixture must be composed of an acid salt of a mineral acid with at least two alkali halogen salts. This is undoubtedly due to the fact that free hydrochloric acid is liberated just at the time it is needed and consequently none of it is lost by evaporation, as is the case with a mixture of acetic acid or other free acid with sodium bisulfate in the original mixture.

In my composition, the free hydrochloric acid first liberated, in turn liberates hydrofluoric acid, according to the well known chemical laws of replacement of halogens, and I find that the resulting product does not deteriorate on storage, which makes for its commercial utility.

I claim as my invention:

1. The soluble sour-forming chemical formed by mingling acid sulfate of sodium with approximately half as much each in weight of sodium fluorid and sodium chlorid.

2. A sour-forming chemical comprising soluble acid sulfate, fluorid and chlorid salts of an alkaline base.

3. A sour-forming chemical comprising soluble acid sulfate, fluorid and chlorid salts, the sulfate salt being approximately double that of either of the other salts.

4. The substantially stable salt for bleaching and cleaning purposes, formed by intermingling sodium acid sulfate, sodium fluorid and sodium chlorid in nearly dry state.

5. The substantially stable chemical for bleaching and cleaning purposes, formed by the nearly dry intermingling of an acid sulfate of an alkaline base, a fluorid of an alkaline base, and sodium chlorid.

In testimony that I claim the foregoing as my invention I affix my signature in the presence of two witnesses, this 28th day of October, A. D. 1916.

CHARLES E. McADAM.

Witnesses:
T. N. ALFREDS,
KARL W. DOLL.